United States Patent [19]
Moore, Jr. et al.

[11] Patent Number: 5,423,128
[45] Date of Patent: Jun. 13, 1995

[54] CIGARETTE FILTER ROD MINIMUM POINT GAUGE

[75] Inventors: Jack S. Moore, Jr., Jonesborough; Richard L. Steffen, Kingsport, both of Tenn.

[73] Assignee: Eastman Chemical Company, Kingsport, Tenn.

[21] Appl. No.: 116,832

[22] Filed: Aug. 10, 1993

[51] Int. Cl.$^6$ ............................................. G01B 21/00
[52] U.S. Cl. ........................................ 33/488; 33/712; 33/549; 131/905; 131/908
[58] Field of Search ................ 33/1 R, 488, 712, 501, 33/549; 131/905, 908; 356/237, 239, 240

[56] References Cited

U.S. PATENT DOCUMENTS

| | | | |
|---|---|---|---|
| 1,145,959 | 7/1915 | Amstutz | 33/501 |
| 1,974,606 | 9/1934 | Fassin | 33/712 |
| 2,366,430 | 1/1945 | Benton | 33/501 |
| 2,899,747 | 8/1959 | Weir | 33/1 R |
| 3,163,940 | 1/1965 | Geiser | 33/488 |
| 3,557,374 | 1/1971 | Schmermund | 131/908 |
| 4,559,712 | 12/1985 | Kubetin | 33/501 |
| 4,907,607 | 3/1990 | Focke et al. | 131/908 |
| 4,944,314 | 7/1990 | Bolt | 131/908 |
| 4,955,948 | 9/1990 | Focke et al. | 131/908 |

OTHER PUBLICATIONS

ESTRON ® Acetate Tow for Cigarette Filters, Eastman Chemical Company, Publication No. ETB-171A, Aug., 1984.

*Primary Examiner*—Thomas B. Will
*Attorney, Agent, or Firm*—Bernard J. Graves, Jr.; Harry J. Gwinnell

[57] ABSTRACT

Provided is an apparatus which allows for the facile and accurate measurement of the recess of a cylindrical core of filter tow which is surrounded by a paper wrapper which extends beyond the core to form the recess.

1 Claim, 4 Drawing Sheets

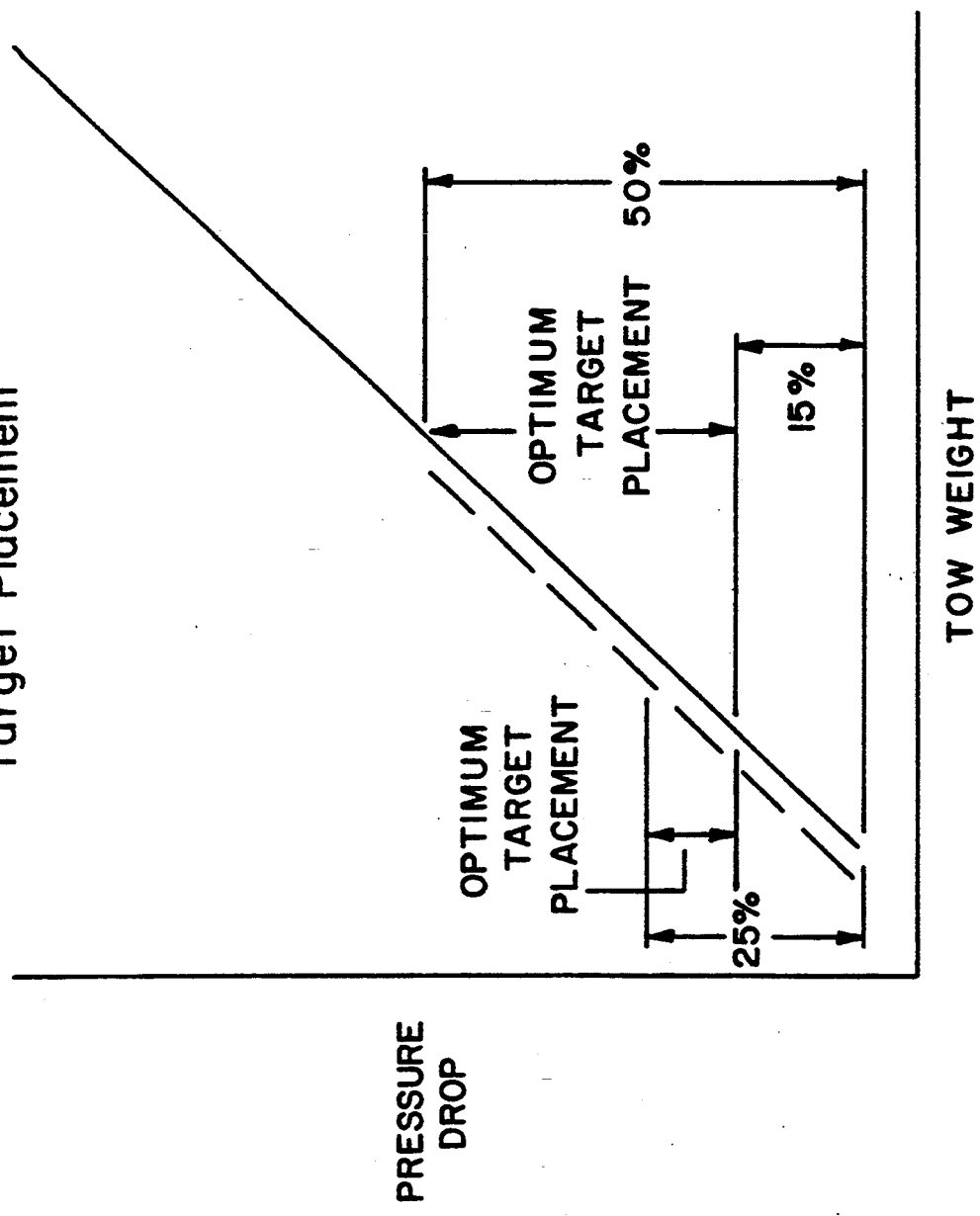

CIGARETTE FILTER ROD MINIMUM POINT GAUGE

FIELD OF THE INVENTION

This invention is directed to a method and device for determining the capability curve minimum point of cellulose acetate filter rods.

BACKGROUND OF THE INVENTION

Cellulose acetate fibers are widely used as filters for various tobacco products, e.g., cigarettes. The fibers themselves are often referred to as "filter tow" and are generally produced by forcing an acetone/cellulose acetate dope through a spinnerette under pressure sufficient to form a continuous bundle of fiber, which is subsequently compacted to form a filter rod.

One of the primary methods for determining the filtration performance range for a given sample of filter tow is the calculation of the so-called "capability curve". A capability curve's minimum point can be consistently determined if care is taken by the plugmaker operator to obtain filter rod recess which is indicative of a minimum point. A plugmaker operator can often repeatedly adjust to the same amount of recess which he feels represents a minimum point. However, a different operator may get a significantly different amount of recess which he felt represented the same minimum point and neither one may repeatedly have obtained the desired amount of recess. While apparent recess differences may appear to be small, the pressure drop of the filter rods can be markedly different.

Specific properties of filter rods are affected by the properties of the tow used to make the rods and by other rod properties.

A capability range of filter rod weight and pressure drop is possible with cellulose acetate filter tow because crimped tow is extensible. The relationship between the weight of tow in a filter rod and the pressure drop of the rod is direct and linear for a given tow sample. As the speed of the tow processing unit is increased or decreased in relation to the speed of the plugmaker, there will be a corresponding increase in rod pressure drop.

To determine the capability range of a given tow item on a specific filtermaking machine, filter rods should be produced at the highest tow weight possible (i.e., maximum capability) and the lowest weight possible (minimum capability). The maximum capability point is normally defined as the point at which the garniture of the plugmaker will not accept additional tow. Attempts to increase the tow weight beyond this point will result in roll wraps, failure to seal the rod seam, or excessive variation in filter rod properties. The minimum capability point is normally defined as supplying the lowest tow weight possible to the garniture while maintaining an acceptable rod from the standpoint of no wrinkles and very slight end recess (approximately 1.0 mm). In capability evaluations, rods at midpoint weight (halfway between minimum and maximum) are also produced. The rods produced at these three conditions (maximum, minimum, and midpoint) are tested from circumference, weight, and pressure drop and the results are plotted graphically. When a line is drawn through these plotted points, the pressure drop/weight relationship can be determined at any point along the line. The line generated by this procedure is generally referred to as a "capability curve", see FIG. 4.

An important point to remember regarding the "capability" of a tow item on a particular type of filter making equipment concerns target placement. If the target is not well placed on the capability curve, it is likely that processing difficulties or poor quality rods may result. If the above parameters are used for the determination of the minimum capability point (rod recess approximately 1.0 mm and no wrinkles), selection of a target pressure drop of at least 15 percent above the minimum pressure drop is preferred. If slow speed filter making equipment is used or if standard tow transport jet systems are used on high speed filter makers, the target pressure drop should not be more than 25 percent above the minimum pressure drop. If "capability extension" systems such as the EASTMAN Type II tow transport jet or the modified HAUNI tow transport jet system are used, the upper limit for target pressure drop may be increased to as much as 50 percent above the minimum pressure drop. In this fashion, target pressure drop is referenced to the minimum point.

BRIEF DESCRIPTION OF THE DRAWINGS

FIG. 4 is plot of pressure drop versus tow weight.

SUMMARY OF THE INVENTION

Figure 1:
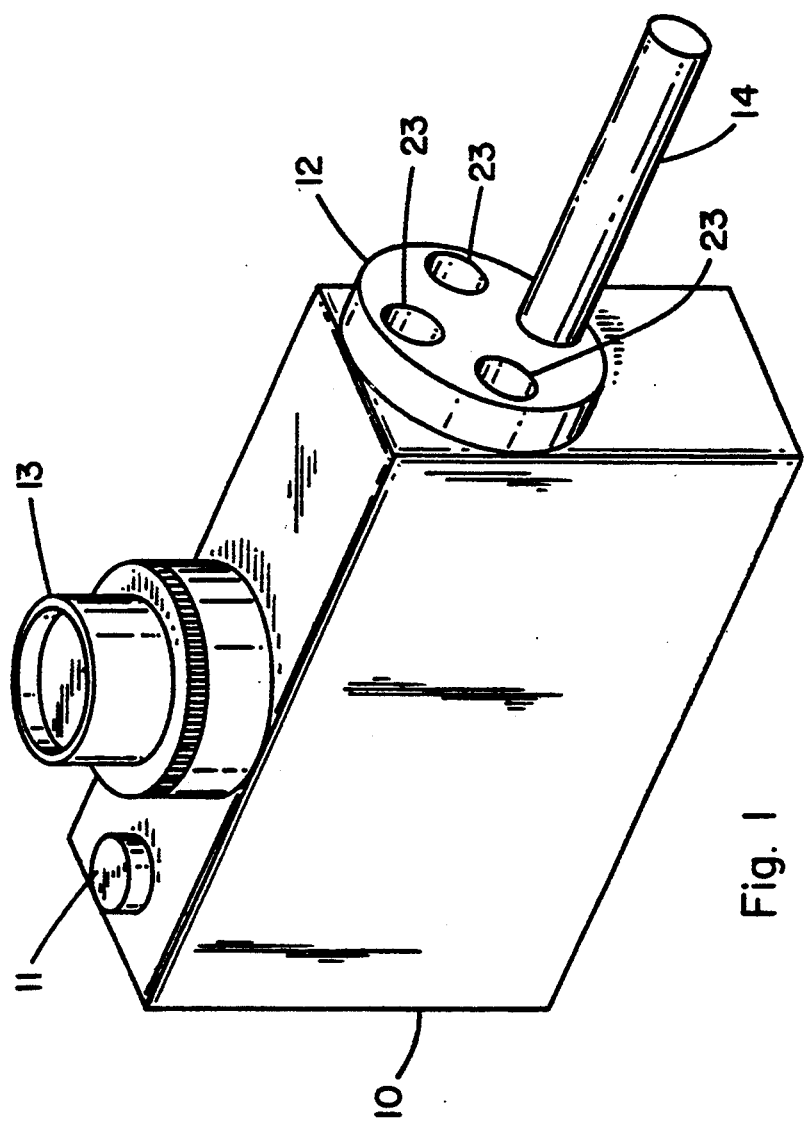
FIG. 1 is a diagram of the preferred apparatus of the present invention.
Figure 2:
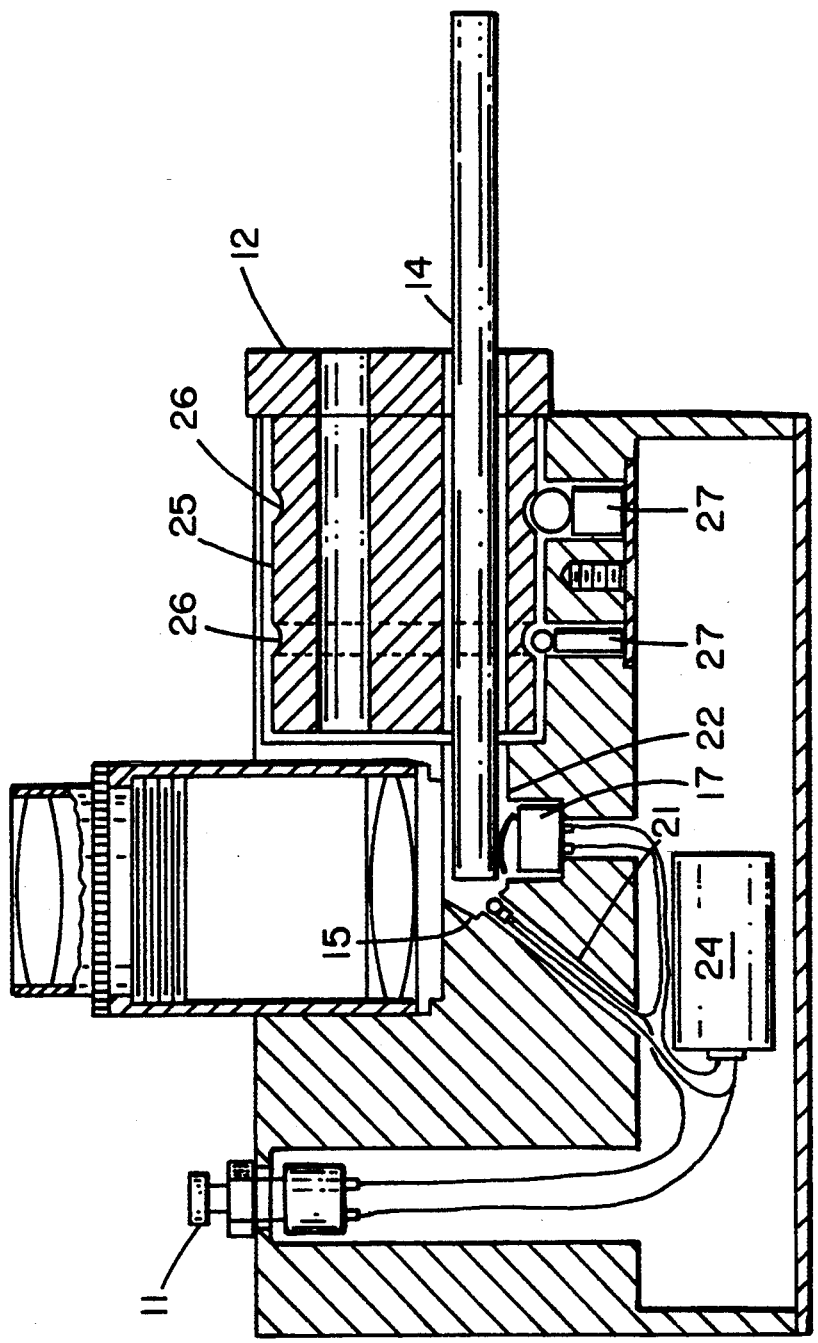
FIG. 2 is a side view cross-section of the preferred apparatus of the present invention.
Figure 3:
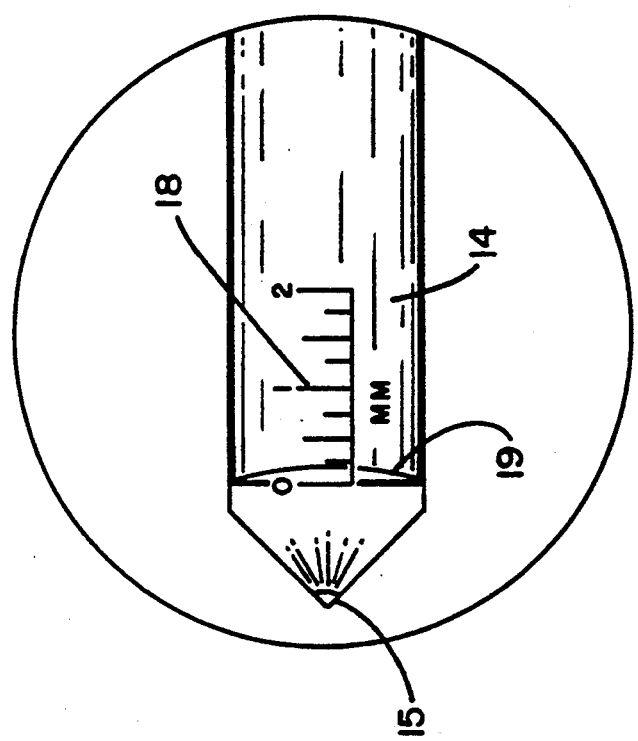
FIG. 3 is a top view of the apparatus, showing the view through the eyepiece and illustrating the measurement of the recess.

The present invention provides an apparatus which allows for the facile and accurate measurement of the recess of a cylindrical core of filter tow which is surrounded by a paper wrapper which extends beyond the core to form said recess. In the use of the apparatus of the present invention, the end of the filter rod is illuminated, at a proper angle, to allow the recess to be measured through a magnifier and scale (mm) arrangement. By the use of this apparatus, rod recess can be measured to the nearest 0.125 mm.

DETAILED DESCRIPTION OF THE INVENTION

This invention provides an optical means for a plugmaker operator to quickly and accurately measure a filter rod's recess by combining the two presently used methods, i.e., the microscopic analysis and the visual estimate. The present invention is more accurate than the visual estimate, and yet is more conveniently done than the microscopic analysis.

In a preferred embodiment of the present invention, the body (10) of the apparatus, which requires some drilling and machining, can be fabricated from any durable material, for example MYCARTA ™. The body accommodates a light source (15), a switch (11), a turret (12) having a multiplicity of variable-sized circular openings (23), an eyepiece (13), and associated retaining hardware. The turret may be fabricated from the same material as the body. The turret (12), is rotatably mounted on the apparatus via the rotation of the attached barrel (25). The barrel (25) preferably has at least one locating pin and ball (27) which engage a groove (26) on the barrel (25).

The light intensity from the light source (15) must be of sufficient intensity to easily read the scale (18) above the illuminated paper/tow interface, but should not be so bright as to "wash out" the identification of the paper/tow interface or recess (19). The light illumination angle (21) is not critical and need only allow illumination at the filter rod's end at the plugwrap paper/tow interface.

The light source may be provided by a reflection of ambient light or by a battery-operated light (e.g., (24)) or AC-powered light of conventional construction. In a preferred embodiment of the present invention, the light source is a battery-operated light. In either case, the light source is preferably controlled by a switching means (11). Said switching means may be momentary-on type switch which would provide a light source for the time necessary to make the visual inspection of the minimum point. Alternatively, the switching means may be a microswitch (17) located in the rod barrel (22) which would engage said light source (11) when a filter rod is inserted.

Operation of the Device

One end of a filter rod (14) is partially inserted into the lowest usable diameter turret hole (23). The operator then looks into the eyepiece, turns on the light, and completes the insertion until the end of the paper coincides with the "0" mm mark on the engraved reticle (18). The filter rod is then rotated, keeping its end aligned with the "0" mm mark, until the area of greatest average tow recess is observed and the recess amount is read from the scale. Although the scale is divided into 0.25 mm increments, it is possible to determine recess to the nearest 0.125 mm. After removing the filter rod, it is preferred that the additional filter rods be tested for a statistically significant number of times to calculate an average recess for the filter rods in a lot.

The device of the present invention has been routinely used to determine the minimum points of capabilities performed on a variety of tow types. After giving plugmaker operators a specific recess in millimeters which has been defined as an acceptable minimum point, there has been a definite improvement in the plugmaker operator's ability to obtain consistent minimum points, particularly when performing multiple capability tests on the same tow type. As with any instrument which requires an individual's visual assessment, even when given a scale to use, there remains some degree of interpretation. However, the range of interpretation has been greatly reduced by the present invention. Since filter rods are by their very nature somewhat fragile, care must be taken when handling the rods and inserting them into the device.

There is currently no device which will easily assist a plugmaker operator in determining when a capability minimum point is reached. In most cases, this analysis is a very subjective assessment, and the results can be quite variable when the capability minimum points of several different plugmaker operators are compared for the same filter tow type. This invention provides the means to more accurately and consistently obtain a capability minimum point not only for one plugmaker operator, but also among many plugmaker operators.

Thus, the present invention provides an apparatus for measuring the recess of a filter rod wherein a generally cylindrical core of filter tow is surrounded by a translucent wrapper which extends beyond said core to form a recess of the core, comprising
(a) a support for holding a filter rod in a fixed position;
(b) a light source or means for reflecting ambient light, said light source having sufficient intensity at the end of said filter rod, to allow for optically showing the extent of said recess; and
(c) a scale adjacent said filter rod at the recess thereof whereby the recess can be measured by the extent of the illuminated wrapper.

We claim:

1. An apparatus for measuring recess of a filter rod wherein a generally cylindrical core of filter tow is surrounded by a translucent wrapper which extends beyond said core to form a recess of the core, said apparatus comprising
(a) a support for holding a filter rod in a fixed position;
(b) a light source or means for reflecting ambient light, said light source or means for reflecting ambient light having sufficient intensity at the end of said filter rod, to allow for optically showing the extent of said recess; and
(c) a scale adjacent said filter rod at the recess thereof whereby the recess can be measured by the extent of the illuminated wrapper,
wherein said support is a body having at one end a rotatably mounted turret capable of receiving a plurality of cylindrical filter rods of varying diameter, and wherein said apparatus further comprises a viewing means mounted perpendicularly to said turret, said viewing means fitted with a magnifying lens and said scale for measuring the recess of a filter rod when said filter rod is inserted through said turret into the field of view of said viewing means.

* * * * *